Aug. 18, 1931.   G. F. TAYLOR   1,819,927
METAL STENCIL
Filed Aug. 1, 1929
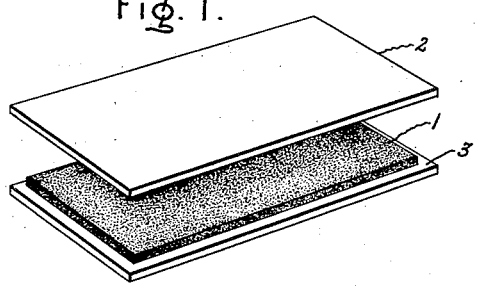
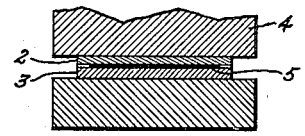
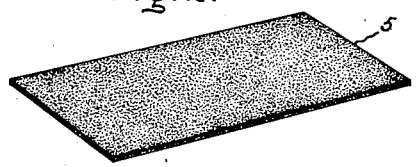
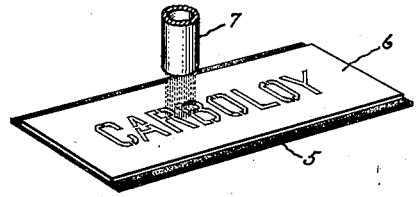
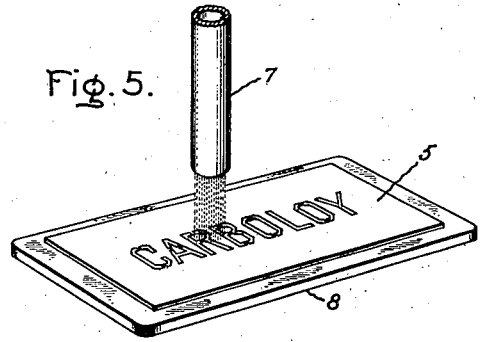
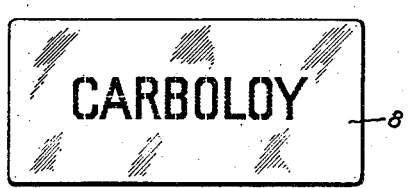
Inventor:
George F. Taylor,
by Charles E. Tullar
His Attorney.

Patented Aug. 18, 1931

1,819,927

UNITED STATES PATENT OFFICE

GEORGE F. TAYLOR, OF SCHENECTADY, NEW YORK, ASSIGNOR TO GENERAL ELECTRIC COMPANY, A CORPORATION OF NEW YORK

METAL STENCIL

Application filed August 1, 1929. Serial No. 382,707.

The present invention relates to metal stencils made from hard, wear-resistant material and to a method for making them. Ordinarily, metal stencils are constructed of relatively soft metals. Such stencils are obviously not suitable for use when abrasive materials are employed in the stenciling operation, for example in stencilling an insignia on glass by means of sand blast apparatus.

It is one of the objects of the present invention to provide a metal stencil which is very hard and tough and capable of practically unlimited wear without serious deterioration even when used in connection with sand blast apparatus.

The material which I employ in the construction of my improved stencil is a sintered composition consisting of tungsten carbide and cobalt. A metallic composition of this character is disclosed in the patents to Schröter Nos. 1,549,615 and 1,721,416, and, in general, contains from a few per cent to about 25% cobalt, the remainder of the composition being tungsten carbide.

The novel features which are characteristic of my invention are set forth with particularity in the appended claims. My invention itself however will best be understood from reference to the following specification when considered in connection with the accompanying drawings in which Figs. 1, 2, 3 and 4 are views representing various steps in the formation of the stencil; Fig. 5 is a perspective view of an application of my improved stencil; Fig. 6 is a plan view of a glass plate which has been stencilled with my improved stencil, while Fig. 7 illustrates a modification of my invention.

In carrying out my invention, I mix tungsten carbide and cobalt in powdered form in the proportion of about 13% cobalt and 87% tungsten carbide with a small amount of starch paste, and spread the powdered mixture 1 between two molybdenum plates 2 and 3, each about $\frac{1}{16}''$ to $\frac{1}{8}''$ thick. The plates 2 and 3 and interposed mixture 1 are then placed in a closed carbon receptacle (not shown) and the mixture slightly sintered by firing at a temperature of about 850 to 950° C. for about 72 hours in a hydrogen atmosphere. During the sintering operation a small weight 4 is applied to the mixed powdered material to prevent warping or bending of the plate 5 formed in the process.

The slightly sintered plate 5 is flat and may be handled easily without breaking. It is also relatively soft and may be easily worked or cut by sand blast apparatus.

To cut an insignia in plate 5, it is placed under a suitable stencil 6 and a sand blast 7 directed against the plate and the superimposed stencil, as indicated in Fig. 3. The plate is relatively soft and the sand blast easily cuts through it. After the insignia has been cut, plate 5 is again placed between molybdenum plates 2 and 3 and weight 4 again applied thereto. The combined plates and weight are then placed in a closed carbon boat and heated in a hydrogen furnace to a temperature which may vary from about 1375 to 1400° C. which is the sintering temperature of the mixed materials. When heated to this temperature, plate 5 becomes very hard and tough and wear-resisting and may be employed with a sand blast apparatus to stencil a glass plate 8.

The weight employed in pressing the powdered materials 1 or the partially sintered plate 5 should not be too heavy as otherwise the molybdenum plates 2 and 3 will stick to the intermediate plate when it is heated to the temperature employed. It will be found that a weight of a few pounds per square inch will provide sufficient pressure to prevent the plate 5 from warping during the heating process.

Instead of employing the metal stencil 6, I may cover the partially sintered plate 5 with a layer 9 of wax, cut the desired impression in the wax so as to expose portions of the plate 5, and apply a sand blast to the wax covered plate. The sand blast cuts away that portion of the plate 5 which is exposed to the blast, while the wax completely protects the remainder of the plate.

Although I prefer to employ a sintered mixture of tungsten carbide and cobalt, it will be obvious that other sintered hard metal compositions may be employed if desired. For example, molybdenum carbide may be substituted for tungsten carbide, while nickel or iron or any combination of iron, nickel and cobalt up to 25% of the total content of the composition may be employed.

A higher percentage of cobalt than 25% may be employed if desired. It should be noted however that as the cobalt content of the composition is increased the sintered plate 5 becomes softer. Likewise, as the cobalt content decreases, the composition becomes very hard and at the same time quite brittle.

What I claim as new and desire to secure by Letters Patent of the United States, is:

1. The method of making a stencil from a mixture of powdered materials which comprises forming the powdered materials into a substantially flat plate, partially sintering the plate at a relatively low temperature while under pressure, cutting an insignia in the plate and heating the plate under pressure to a relatively high temperature.

2. The method of making a stencil from a mixture of powdered materials which comprises binding the powdered materials together under pressure at a relatively low temperature to form a plate, perforating the plate to produce an insignia therein and heating the plate under pressure to a relatively high temperature.

3. The method of making a stencil from a mixture of powdered materials consisting largely of tungsten but containing appreciable amounts of cobalt and carbon, which comprises forming the powdered materials into a substantially flat plate, heating the powdered materials under pressure to a temperature varying from about 850° C. to about 950° C., perforating the plate and again heating the plate under pressure to a temperature of about 1350° C.

In witness whereof, I have hereunto set my hand this 31st day of July, 1929.

GEORGE F. TAYLOR.